United States Patent Office 3,426,532
Patented Feb. 11, 1969

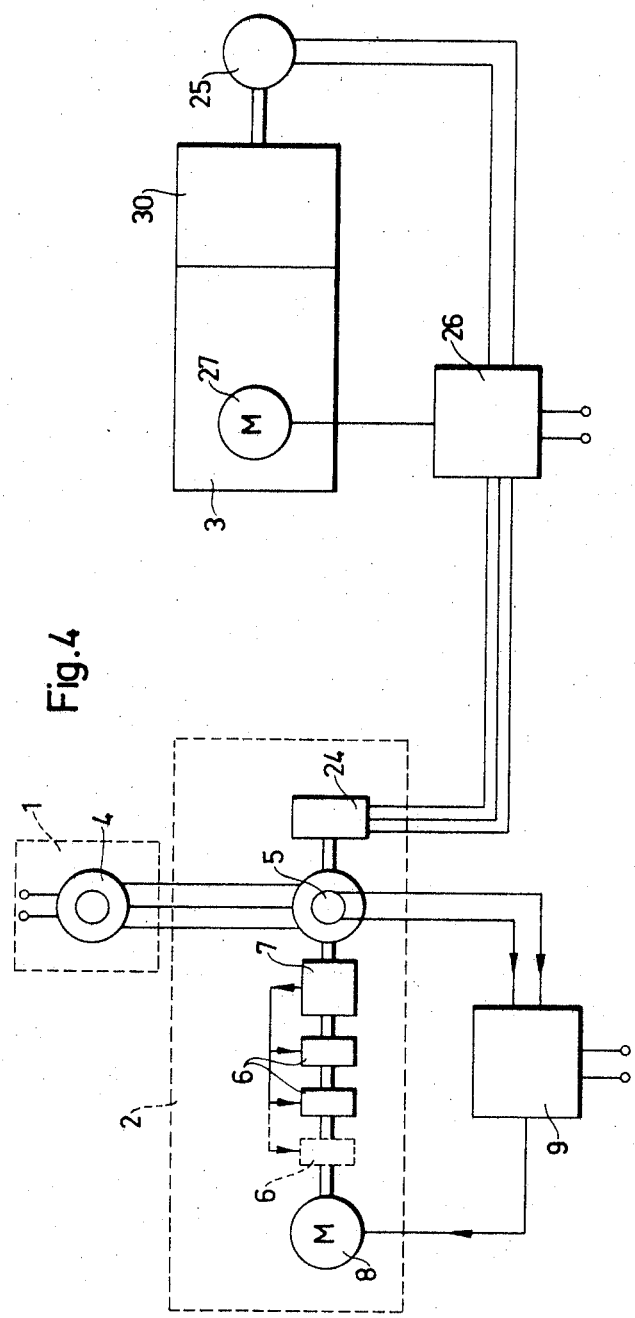

3,426,532
REMOTE CONTROL SYSTEM FOR POWER PLANT PREFERABLY FOR THE DIRECT CONTROL OF A SHIP'S MAIN PROPULSION POWER PLANT FROM THE SHIP'S BRIDGE
Gunnar A. Kihlberg, Ekorrvagen 4, Sollentuna, Sweden, and Henry E. Reit, Rorstrandsgatan 46, Stockholm, Sweden
Filed Feb. 10, 1966, Ser. No. 526,599
Claims priority, application Sweden, Feb. 10, 1965, 1,660/65
U.S. Cl. 60—105
Int. Cl. F01k *13/60;* H02p *1/54*
15 Claims

ABSTRACT OF THE DISCLOSURE

A remote control system for controlling the power plant of a ship such as controlling the speed of the ship, which includes a transmitting unit such as a synchro transmitter, adapted to develop an electrical signal proportional to the desired change in operation of the ship, such as an electrical signal proportional to an increase in speed, a storage and comparison system, such as a synchro comparator, which is adapted to store the next previous electrical signal from the transmitter, receive the new electrical signal from the transmitter, and change the mechanical position of the comparator ready for comparison with the next received signal, and finally to produce an output signal proportional to the difference between the previous signal and the new signal, and a control unit, such as a synchro comparator mechanically coupled to the speed governor of the ship's engine, which is adapted to receive the signal from the storage and comparison unit, and change the position of the operating element of the propulsion system to bring about the demanded change in operation.

The present invention relates to a remote control system for power plant and preferably for the remote control of a ship's main propulsion power plant from the ship's bridge, said system comprising a control circuit including a transmitting unit and a control unit. This system is characterized by a program unit connected into the control circuit and adapted so to process an order transferred from said transmitting unit to said control unit as to impart to said order a form matching to the actual operating condition of the power plant.

It is presently a requirement to be able to remote-control propulsion power plant. In particular, it is desired to be able to control the main propulsion power plant of a ship directly from the ship's bridge, according to current practice, the control of a ship, for example, is carried out indirectly by the officer in command on the ship's bridge operating his machine-telegraph to send an order to the engine-room where one or more engineers will execute the order manually by making adjustments of the main propulsion engine, taking into account the characteristics and limitations of the machinery. Thus, starting-up, shut-down and other control operations of the main propulsion engine are carried out by hand. The present invention has for its object to provide means for effectively enabling the control of the main propulsion engine of a ship, for example, to be carried out directly from the ship's bridge.

Figure 1:
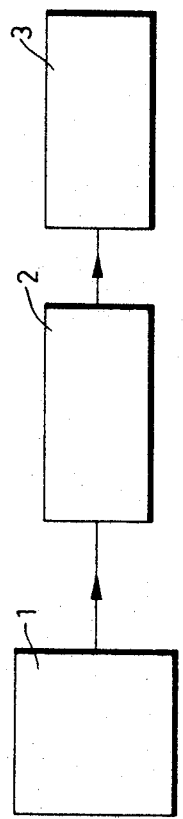
Figure 2:
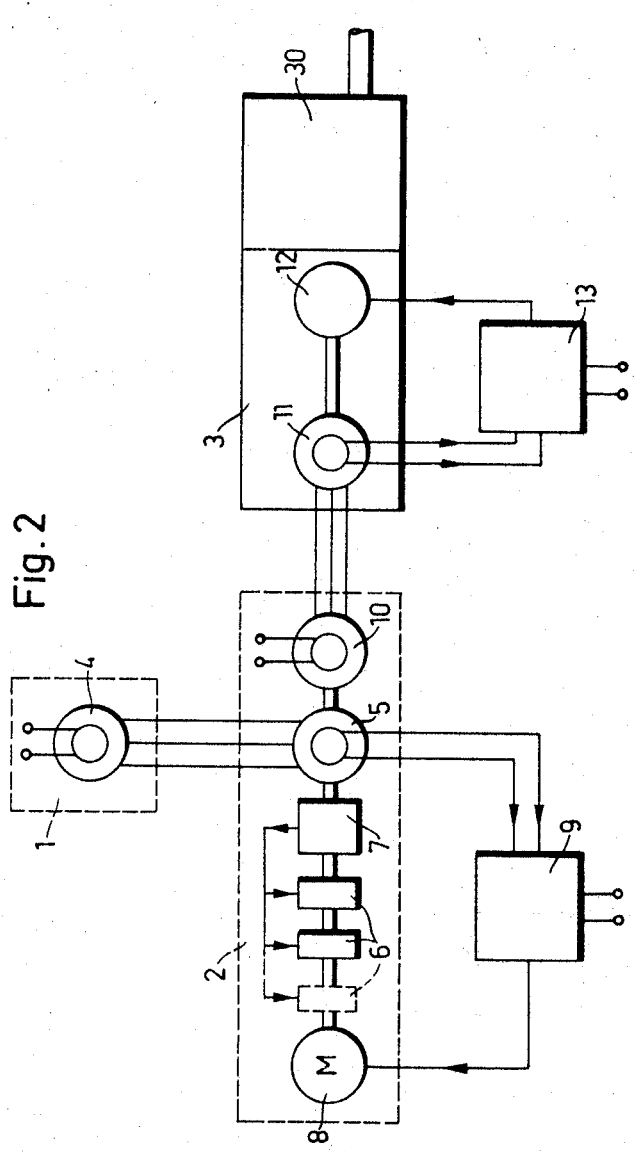
Figure 3:
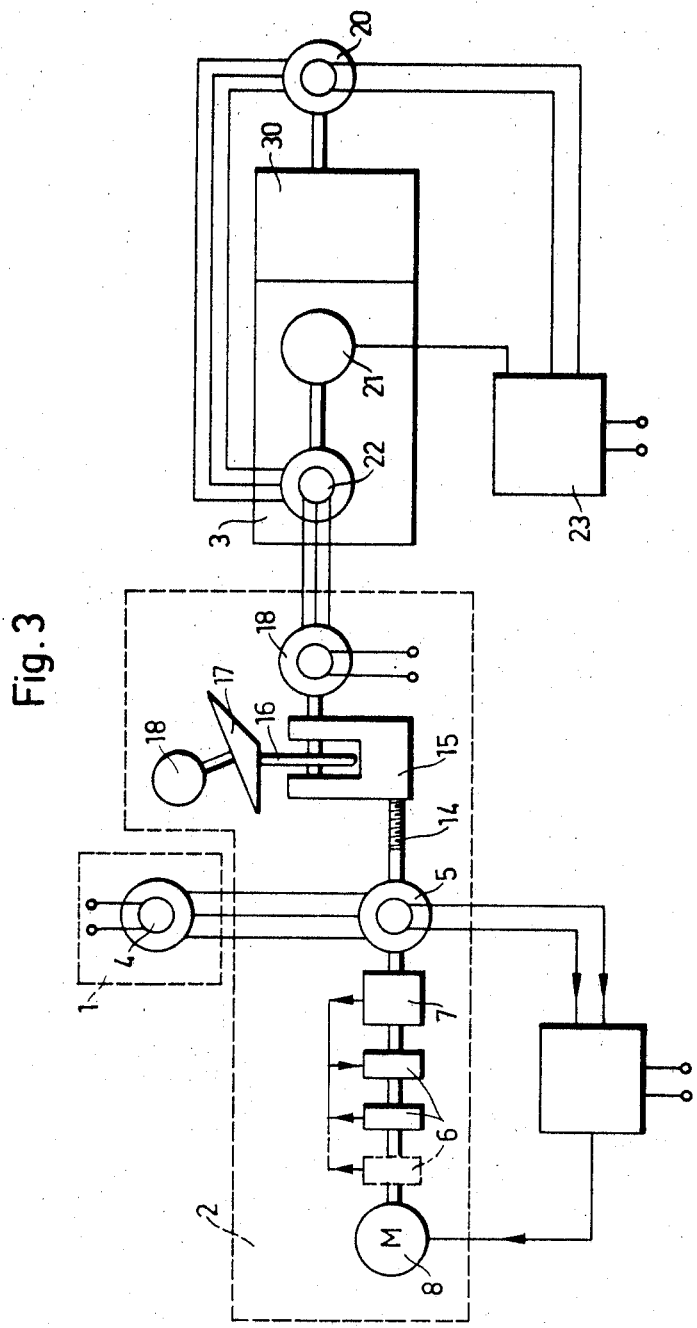

The invention will be explained more closely hereinafter in conjunction with the accompanying drawing, in which:

FIG. 1 illustrates its general design principles, while FIGS. 2, 3 and 4 diagrammatically show different embodiments of the same.

Referring to FIG. 1, the system comprises a control circuit including a transmitting unit in the form of a machine-telegraph 1, a program unit 2 and a control unit 3 for controlling the engine-speed governor or starter of the ship's propulsion engine. The program unit is adapted to process an order applied to the control unit from the engine-telegraph in such a way as to conform the order to the actually existing operating condition of the machinery. Safety and monitoring devices additionally required to deal with any failures occurring in the machinery or its associated auxiliary equipment are not illustrated since they may vary substantially depending on the type of machinery actually employed.

One embodiment of the system according to the invention is illustrated in FIG. 2, in which the engine-telegraph 1 disposed on a ship's bridge comprises a synchro transmitter 4 the set mechanical angle $\beta_g$ of which corresponds to a rotational speed ordered to the main engine, the "index value." The program unit 2 contains a synchro comparator 5 having a mechanical angle $\beta_j$ corresponding to the actual setting of the program unit. Synchro transmitter 4 and synchro comparator 5 are electrically connected together to form a synchro chain, and the output voltage of the comparator is proportional to sin $(\beta_j - \beta_g)$. The program unit also contains an electrically operable gearing 6, cams 7 together with switches actuated thereby, and a driving motor 8 adapted to drive the comparator 5 and cams 7 through said gearing. The output voltage of the comparator, by means of an amplifier 9, for example, controls the driving motor 8, the latter thus, through gearing 6, rotating the comparator until $\beta_j - \beta_g = 0$.

The cams inherently contain, through their contouring, the program for processing the order transmitted by the machine-telegraph. The switches actuated by the cams are contained in an electric circuit together with electrically controlled members for operating the change-speed gearing. Thus, the change-speed gearing is controlled by pulses emanating from said cams. Accordingly, the setting speed of comparator 5 is controlled in accordance with the program by the aid of said change-speed gearing 6. The gearing, in the present case, is assumed to be a multi-speed gear, but alternatively it may be a variable-speed gear. By means of the cams and switches, when using a multi-speed gear, the setting speed may be programmed to predetermined values for different positional intervals of the comparator 5.

The program unit has ganged thereto a synchro transmitter 10 having a mechanical angle which, after the comparator 5 has moved into set position, corresponds to the index value according to the engine-telegraph. The rate of movement to accomplish this setting, however, as mentioned hereinbefore, has been modified in accordance with the program contained in the program unit.

Now, the transmitter 10 is caused to control the speed setting of the main propulsion engine 30 in the following manner: A synchro comparator 11 of the control unit 3 is ganged to the control member of the speed governor of the main propulsion engine. The setting of the speed governor is assumed to correspond with sufficient accuracy to the speed of rotation of the main propulsion engine. The synchro comparator 11 is electrically connected to the synchro transmitter 10 of the program unit to form a synchro chain, the output voltage of which, for instance through an amplifier 13, controls a motor 12 adapted to adjust the setting of the engine-speed governor. Thereby, the setting of the speed governor is caused to correspond to the set position of the engine-telegraph on the ship's bridge. After this position having been set, the speed of rotation of the ship's main propulsion engine will thus be controlled and regulated by the governor which may be of any conventional type, such as a centrifugal governor.

Another form of realization of the system according to the invention is illustrated in FIG. 3. In this case, in place of the transmitter 10, there is connected to the program unit a variable-speed gear which, as shown in this embodiment, comprises a cone 17 and a wheel 16 rotating in frictional engagement with this cone. The cone is driven by a timer motor 18 rotating at an accurately known and constant speed. The wheel 16 has imparted to it a speed of rotation which is accurately proportional to the position of the comparator 5. This is due to the fact that wheel 16 is journalled on a nut 15 displaceably mounted on a guide and the position of displacement of which is determined by turning a screw 14 by an amount corresponding to the position of comparator 5. For this purpose, this screw 14 is coupled to said comparator. Ganged to the shaft of wheel 16 is a synchro transmitter 19, and ganged to the shaft of the main propulsion engine is a synchro comparator 20. Said synchros are electrically interconnected to form a synchro chain which is supplied with a constant A.C. voltage, and the output voltage of which is caused to adjust the control member of the main propulsion engine by means of a motor 21 through an amplifier 23, for example. The adjustment of said control member is continued until the angular positions of the comparator 20 and transmitter 19 are equal which means that the main engine shaft is rotating in synchronism with the wheel 16.

In order to attain a satisfactory stabilization of the control operation of the servo-system thus described when adjusting the control member of the main propulsion engine, the synchro chain may be supplemented with a further synchro differential 22 which is mechanically coupled to the drive motor 21 of the engine control member.

In the embodiment just described, the transmission 14 to 17 with its timer motor 18, together with the synchro chain 19, 20 and 22, if present, may alone control and govern the speed of rotation of the main propulsion engine instead of a conventional speed governor, or in cooperation with such a governor. This arrangement is adapted to effect an extremely accurate governing and control of the main propulsion engine speed.

A still further embodiment of the system according to the invention is illustrated in FIG. 4. Connected to the output of the program unit in this case is a transmitter 24, such as a linear potentiometer, for example, adapted to supply an output voltage proportional to the position of comparator 5. Mechanically coupled to the output shaft of main propulsion engine 30 is a tacho-generator 25 supplying an output voltage proportional to the speed of rotation of said output shaft. The difference between the output voltage of the transmitter 24 and the tacho-generator voltage is caused, through an amplifier 26, for example, to control a motor 27 which operates to adjust the control member of the main propulsion engine until said voltage difference has been reduced to zero, thereby causing the output shaft of the main propulsion engine to attain a rotational speed corresponding to the set position of the engine-telegraph on the bridge.

As the transmitter of the engine-telegraph it is possible, of course, to employ other devices than synchros, such as potentiometers, for example. This is possible also in respect of the transmission of the positional information from the program unit to the adjustment member of the speed governor in the embodiment first described.

We claim:

1. A system for remotely controlling a power plant, comprising,
   (a) an electrical command signal transmitter having an output command signal characteristic of a desired operating function of said power plant;
   (a) an electrical program unit, electrically connected to the output of said command signal transmitter, including, means to store the next previous command signal transmitted by said command signal transmitter, compare said stored next previous command signal with the current command signal from said command signal transmitter and produce an output control signal proportional to the difference between said two command signals; and
   (c) an electrical control unit, electrically connected to the output of said program unit and operatively coupled to said power plant to adjust an operating element of said power plant in proportion to said control signal, whereby said operating function of said power plant is adjusted to said desired operating function.

2. A system in accordance with claim 1 wherein the command signal transmitter is a machine-telegraph.

3. A system in accordance with claim 2 wherein the machine-telegraph includes a synchro transmitter.

4. A system in accordance with claim 1 wherein the program unit includes an electromechanical transducer for converting the next previous command signal to a mechanical positional setting of said program unit, converting the current command signal to a mechanical positional setting of said program unit, mechanical comparator means for comparing the two mechanical positional settings, and an electromechanical transducer for converting a differential mechanical output of the comparator to an electrical signal.

5. A system in accordance with claim 1 wherein the control unit is coupled to the speed governor of the power plant.

6. A system in accordance with claim 1 wherein the control unit is coupled to the starter of the power plant.

7. A system in accordance with claim 1 wherein the control unit additionally includes means for monitoring the operating function of the power plant and producing an electrical monitor signal proportional to the instantaneous value of said operating function and means for comparing said monitor signal with the control signal to produce a differential operating signal and applying said operating signal to the operating element of the power plant.

8. A system in accordance with claim 7 wherein the monitoring means is a synchro comparator adapted to compare the control signal with a monitor signal produced by the operation of the power plant shaft.

9. A system in accordance with claim 1 wherein the program unit includes means for storing command signals and means for comparing command signals as stepped functions.

10. A system in accordance with claim 9 wherein the stepped functions are produced by a change-speed gearing system.

11. A system in accordance with claim 1 wherein the program unit includes means for storing command signals and means for comparing command signals in continuous functions.

12. A system in accordance with claim 11 wherein the continuous functions are produced by a constant speed-timing motor.

13. A system in accordance with claim 1 wherein the output signal of the command signal transmitter is derived from a linear potentiometer.

14. A system in accordance with claim 1 wherein the output signal of the program unit is derived from a linear potentiometer.

15. A system in accordance with claim 1 wherein the control unit includes electromechanical tranducer means for converting the control signal to a mechanical equivalent of the operating function of the control signal; means for monitoring the instantaneous value of said operating function of the power plant; means for comparing said equivalent of the operating function of the control signal with said monitored instantaneous value of said operating function to produce a differential value of said operating function; and means for applying said differential value to the operating element of said power plant.

References Cited

UNITED STATES PATENTS

| | | | |
|---|---|---|---|
| 2,615,305 | 10/1952 | Jannsen | 60—54.5 XR |
| 2,657,535 | 11/1953 | Levy | 60—54.5 |
| 2,667,746 | 2/1954 | Kumpf et al. | 60—54.5 XR |
| 3,171,394 | 3/1965 | Beegle | 60—54.5 XR |
| 3,182,456 | 5/1965 | Burnett | 60—54.5 |
| 3,290,881 | 12/1966 | Boehs | 60—54.5 |

MARTIN P. SCHWADRON, *Primary Examiner.*

ROBERT R. BUNEVICH, *Assistant Examiner.*

U.S. Cl. X.R.

318—18